United States Patent
Rüffer et al.

[19]

[11] Patent Number: 6,033,036
[45] Date of Patent: Mar. 7, 2000

[54] ELECTRONICALLY CONTROLLABLE BRAKE OPERATING SYSTEM FOR MOTOR VEHICLES

[75] Inventors: Manfred Rüffer, Sulzbach; Johann Jungbecker, Badenheim, both of Germany

[73] Assignee: ITT Manufacturing Enterprises Inc., Wilmington, Del.

[21] Appl. No.: 09/029,465

[22] PCT Filed: Aug. 22, 1996

[86] PCT No.: PCT/EP96/03711

§ 371 Date: Jun. 15, 1998

§ 102(e) Date: Jun. 15, 1998

[87] PCT Pub. No.: WO97/09212

PCT Pub. Date: Mar. 13, 1997

[51] Int. Cl.[7] .............................. B60T 8/32; B60T 13/66
[52] U.S. Cl. ........................................ 303/114.1; 188/358
[58] Field of Search ................................... 303/3, 10, 11, 303/15, 113.4, 114.1, 114.2, 115.2, 155, 156, DIG. 11; 188/358–360

[56] References Cited

U.S. PATENT DOCUMENTS

| | | | |
|---|---|---|---|
| 4,649,707 | 3/1987 | Belart | 60/550 |
| 4,756,391 | 7/1988 | Agarwal et al. | |
| 4,812,777 | 3/1989 | Shirai | |
| 5,018,353 | 5/1991 | Pugh | 60/562 |
| 5,044,700 | 9/1991 | Willmann | 303/100 |
| 5,308,154 | 5/1994 | Matouka | 303/115.2 |
| 5,312,172 | 5/1994 | Takeuchi | |
| 5,567,021 | 10/1996 | Gaillard | 303/3 |
| 5,713,640 | 2/1998 | Feigel et al. | 303/115.2 |
| 5,758,930 | 6/1998 | Schiel et al. | 303/113.4 |
| 5,806,939 | 9/1998 | Feigel et al. | 303/166 |
| 5,836,659 | 11/1998 | Feigel et al. | 303/115.2 |

FOREIGN PATENT DOCUMENTS

| | | |
|---|---|---|
| 3131856 | 2/1983 | Germany. |
| 3424912 | 1/1986 | Germany. |
| 3502018 | 7/1986 | Germany. |
| 3511535 | 10/1986 | Germany. |
| 3526556 | 1/1987 | Germany. |
| 4335769 | 12/1994 | Germany. |
| 4322182 | 1/1995 | Germany. |
| 4340467 | 6/1995 | Germany. |
| 4413579 | 10/1995 | Germany. |

*Primary Examiner*—Chris Schwartz
*Attorney, Agent, or Firm*—Rader, Fishman & Grauer, PLLC

[57] ABSTRACT

An electronically controllable brake actuating system for automotive vehicles includes a master brake cylinder operable by an actuating pedal and having at least one piston, at least one braking pressure generator actuatable by an electronic control unit, to which braking pressure generator wheel brakes of the vehicle are directly connected and which is connectable to the master brake cylinder by hydraulic connections closable by valve assemblies, at least one sensor device to identify the driver's wish for deceleration, and a simulator chamber which interacts with the master brake cylinder. The reliability of the system may be improved by providing a simulator chamber that is connected to a hydraulic chamber and which is bounded in the master brake cylinder by a second piston, by way of a closable connection.

6 Claims, 2 Drawing Sheets

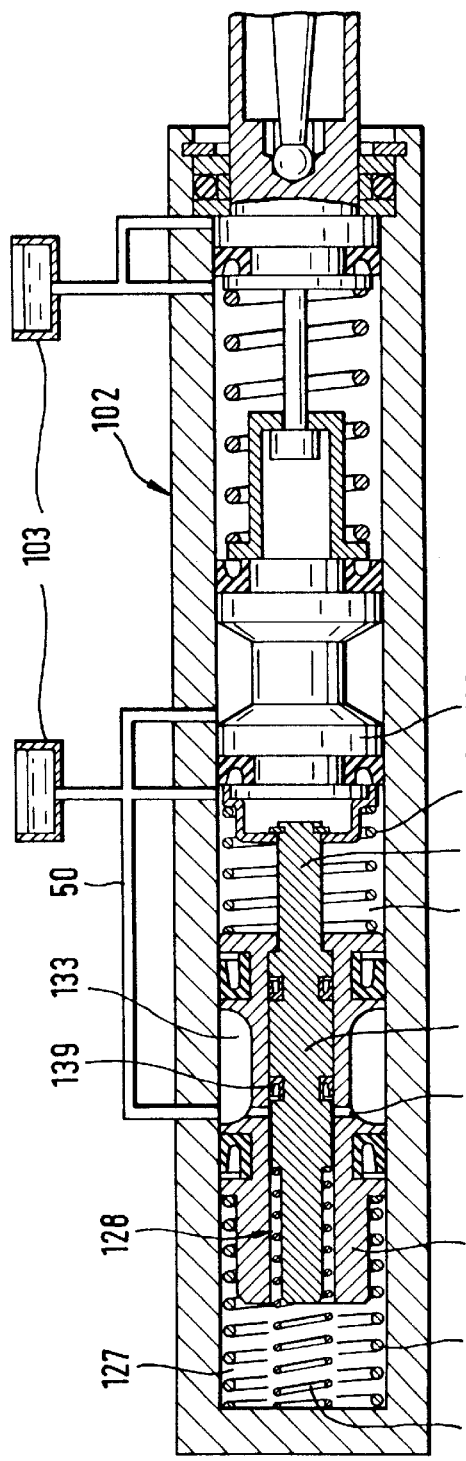
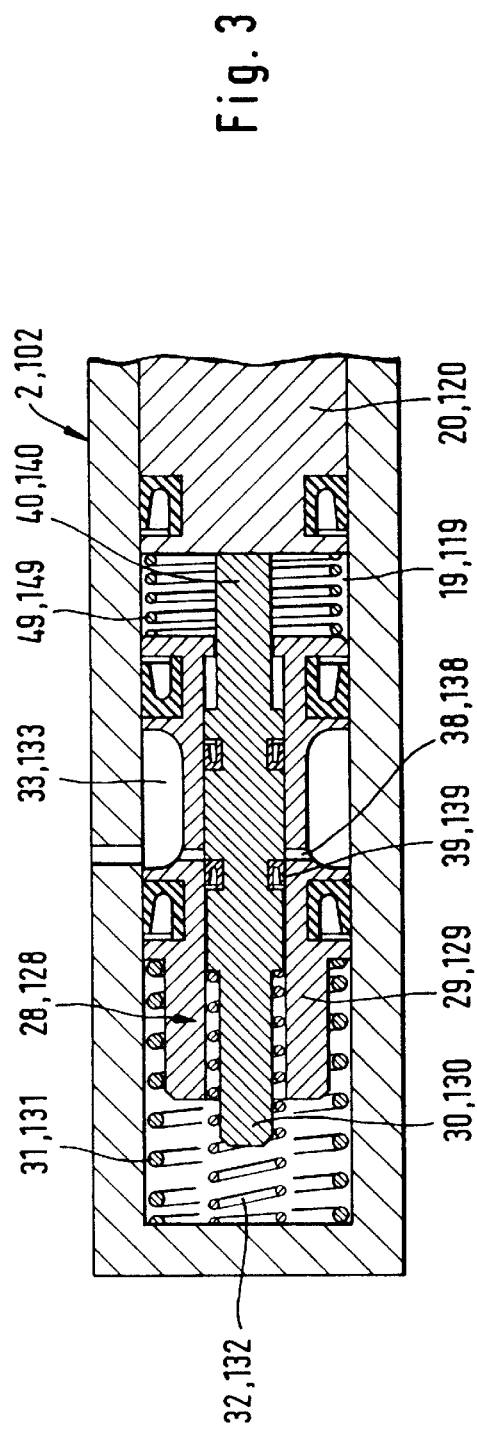

ELECTRONICALLY CONTROLLABLE BRAKE OPERATING SYSTEM FOR MOTOR VEHICLES

BACKGROUND OF THE INVENTION

The present invention relates to an electronically controllable brake actuating system for automotive vehicles which includes a master brake cylinder operable by an actuating pedal and having at least one piston, at least one braking pressure generator actuatable by an electronic control unit, to which braking pressure generator wheel brakes of the vehicle are directly connected and which is connectable to the master brake cylinder by at least one hydraulic connection closable by a valve assembly, at least one sensor device to identify the driver's wish for deceleration, and a simulator chamber which interacts with the master brake cylinder.

A brake actuating system of this type is disclosed in applicant's former application No. 44 13 579. In the prior art brake actuating system, two simulator chambers are associated with the pressure chambers of the master brake cylinder that is configured as a tandem master brake cylinder. The simulator chambers are connected to the pressure chambers by the intermediary of a parallel combination of an electrically actuatable, preferably normally closed (NC) two-way/two-position directional control valve and a non-return valve which opens towards the master brake cylinder.

A disadvantage in the prior art brake actuating system is that the electromagnetically operable two-way/two-position directional control valves, which must be energized with each activation of the system, become frequently leaky in operation and, thus, are a potential source of malfunction.

Therefore, an object of the present invention is to provide an improved electronically controllable brake actuating system of the type referred to hereinabove in terms of an enhanced reliability in operation. In addition, the circuit arrangement of a system of this type shall be simplified considerably.

SUMMARY OF THE INVENTION

A first solution to this object involves that the simulator chamber is connected to a hydraulic chamber, bounded in the master brake cylinder by a second piston, by way of a closable connection. In a preferred aspect of the present invention, the simulator chamber is connected to an annular chamber which is confined in the master brake cylinder by the second piston, and the annular chamber is connected to the hydraulic chamber in a closable way.

According to a second solution to the object of the present invention, the simulator chamber is provided in the master brake cylinder separated from said pressure chamber, limited by a second piston and connected by a closable connection to an unpressurized pressure fluid supply reservoir that is in connection to the pressure chambers of the master brake cylinder.

The present invention will be explained in detail in the following description of two embodiments, making reference to the accompanying drawings.

BRIEF DESCRIPTION OF THE DRAWINGS

In the drawings,

FIG. 2 is a partly cross-sectional view of a second embodiment of the master brake cylinder which can be used in the brake actuating system of the present invention.

FIG. 3 is a partial area of a master brake cylinder shown in FIG. 1 or 2 in an actuating position which corresponds to a case of malfunction.

DETAILED DESCRIPTION OF THE DRAWINGS

Figure 1:
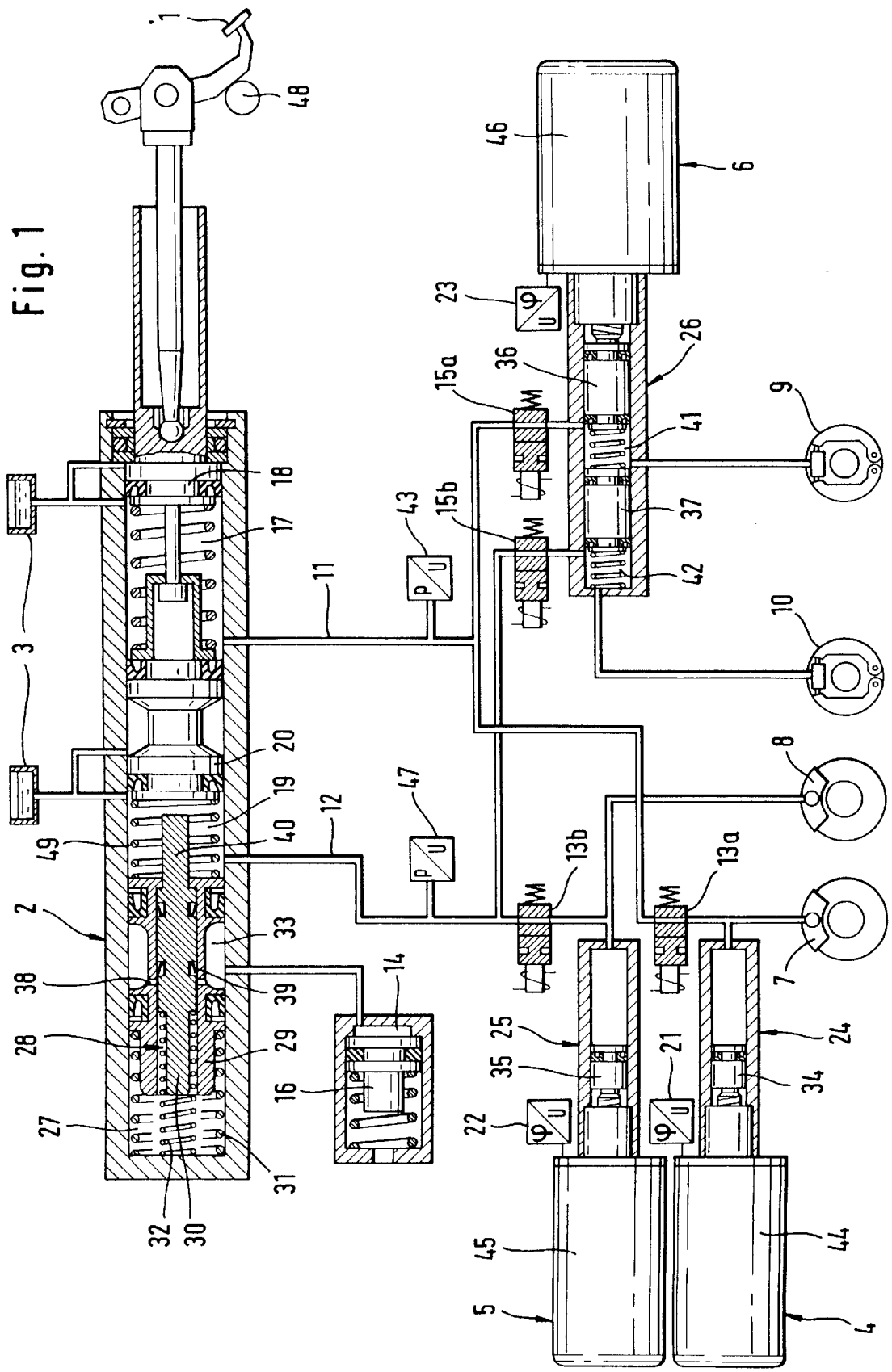
FIG. 1 is a circuit diagram of a first embodiment of the brake actuating system of the present invention.

The electronically controllable brake actuating system of the present invention (shown in the drawing) is intended for use in a front-wheel driven vehicle. The system includes a dual-circuit master brake cylinder or tandem master cylinder 2 operable by an actuating pedal 1. Cylinder 2 includes pressure chambers 17, 19 which are separated from each other and bounded by two pistons 18, 20, and connected to an unpressurised pressure fluid supply reservoir 3. On the one hand, the first pressure chamber (primary pressure chamber) 17 is connected by way of a closable first hydraulic line 11 to a first electrically actuatable braking pressure generator 4 to which a hydraulic wheel brake 8 associated with the front axle, for example, is connected. On the other hand, chamber 17 is connected to a first pressure chamber 41 of a third braking pressure generator 6 which preferably has a dual-circuit design. A wheel brake 9, associated with the other vehicle axle, preferably the non-driven rear axle, is connected to braking pressure generator 6. The connection line is closed by a first electromagnetic valve 13*a*, and a second electromagnetic valve 15*a* is inserted in the line portion which leads to the third braking pressure generator 6. On the one hand, the second pressure chamber (secondary pressure chamber) 19 is in connection to a second electrically actuatable braking pressure generator 5 (to which the other hydraulic wheel brake 8 associated with the front axle is connected) by way of a closable second hydraulic line 12. On the other hand, chamber 19 is connected to a second pressure chamber 42 of the third braking pressure generator 6 to which the other wheel brake 10, associated with the rear axle, is connected. The line 12 is closed by means of a third electromagnetic valve 13*b*, and a fourth electromagnetic valve 15*b* is inserted into the line portion which leads to the third braking pressure generator 6.

As can further be seen in FIG. 1, the second (secondary) pressure chamber 19 of the master brake cylinder 2 is separated from a third pressure chamber 27 by a third piston 28 which additionally limits an annular chamber 33. Connected to the annular chamber 33, which is in communication with the third pressure chamber 27, is a simulator chamber 14 confined by a resiliently preloaded hydraulic piston 16. The third piston 28 preferably has a bipartite design and includes an external piston 29 and an internal piston 30 which extends and is sealed in the external piston 29. Piston 30 is preloaded by a compression spring 32 in opposition to the actuating direction of the master brake cylinder 2 and bears axially against the external piston 29 so that it can be entrained by the latter. The external piston 29 preloaded by a second compression spring 31 has several radial bores 38 which are evenly distributed over its periphery, and open into the annular chamber 33 and permit the above-mentioned connection between chamber 33 and the third pressure chamber 27. In the event of a relative movement between the two piston parts 29, 30, the bores 38 can be overridden by a sealing sleeve 39 arranged on the internal piston 30, so that the connection is interrupted. The relative movement between the internal piston 30 and the external piston 29 can be initiated by axial abutment of the second master cylinder piston 20 on an axial extension 40 of the internal piston 30 or by a transmission of force between the two parts, especially upon failure of the secondary chamber 19, or of the valves 13, 15, or in the absence of operation of the valves 13, 15.

The structure of all three braking pressure generators 4,5,6 is basically identical. Each of the generators includes a hydraulic cylinder 24, 25, 26 in which each one piston 34, 35, 36 and 37 is slidable which is drivable by a preferably reversible d-c motor 44, 45, 46. The joint actuation of the d-c motors 44, 45, 46 and the electromagnetic valves 13a,b, 15a,b is effected by an electronic control unit (not shown) to which the output signals of a brake light switch 48 (interacting with the actuating pedal 1) and of two pressure sensors 43, 47 are sent as input signals. Sensors 43, 47 are connected to the pressure chambers 17, 19 of the tandem master cylinder 2 and permit identifying the driver's wish for deceleration. It is a special advantage that the pressure sensors 43, 47 are provided as component parts of the hydraulic control unit. However, other means, for example, a force sensor which senses the actuating force on the actuating pedal 1, may also be used to identify the driver's wish for deceleration. As further input signals, the control electronic unit can be supplied with data about the actuating travel of the braking pressure generator pistons 34, 35, 36 which are provided by travel or position sensors 21, 22, 23 (shown only schematically). Further, (non-illustrated) wheel sensors are associated with the individual wheels (not shown) in FIG. 1. The outputs signals of the sensors representative of the driving speed are sent to the electronic control unit as further input quantities.

In the embodiment of the subject matter of the present invention shown in FIG. 2, wherein all parts corresponding to FIG. 1 have been assigned like reference numerals increased by 100, the third pressure chamber 127 adopts the function of the simulator chamber 14 mentioned with respect to FIG. 1. A hydraulic connection 50 is provided between the annular chamber 133 and the pressure fluid supply reservoir 103.

The operation of the brake actuating system shown in the drawing is described in detail in the older patent application No. 44 13 579 referred to hereinabove. Upon actuation of the master brake cylinder 2 or 102 (FIG. 2), where the normally open (NO) electromagnetic valves 13a,b, 15a,b are closed, the pressure which develops in the second pressure chamber 19 or 119 displaces the third piston 28 or 128. The internal piston 30, 130 is entrained by the external piston 29, 129, with the result that no relative movement occurs between the two pistons 29, 30 or 129, 130 and the annular chamber 33, 133 remains open. This permits pressure fluid volume to flow from the third chamber 27 or 127 into the simulator chamber 14 or the unpressurised pressure fluid supply reservoir 103 (FIG. 2), which imparts the feeling to the driver that the pressure fluid volume is conducted from the tandem master cylinder 2 into the wheel brakes 7–10. The wheel brakes 7–10 are filled, however, by the pressure generators 4, 5 and 6 in a known fashion. The following equations apply for the forces $F_1$, $F_2$ of the compression springs 31, 131 and 32, 132 which preload the external piston 29, 129 or the internal piston 30, 130:

$$F_1 < P_{SK} \times A_{AK}$$

$$F_2 > P_{SK} \times A_{IK}$$

wherein $P_{SK}$ is the hydraulic pressure which prevails in the second pressure chamber 19, 119, $A_{AK}$ is the surface of the external piston 29, 129, and $A_{IK}$ is the surface of the internal piston 30, 130.

FIG. 3 shows the end area of the master brake cylinder 2, 102 in a case of malfunction, for example, upon failure of the electronic unit, where the electromagnetic valves 13a,b, 15a,b remain open. The pressure fluid volume can flow from the second pressure chamber 19, 119 to the wheel brakes 8, 10 in such a case, and the second master cylinder piston 20, 120 covers a travel, mechanically displacing the internal piston 30 or 130, while the external piston 29, 129 stands still. The result is that the bores 38, 138 in the external piston 29, 129 are overridden by the sealing sleeves 39, 139 so that the connection between the third pressure chamber 27 or 127 and the simulator chamber 14 or the pressure fluid supply reservoir 103 is shut off, and pressure fluid volume cannot be displaced from the third pressure chamber 27, 127. Because pressure fluid volume is not lost in this case, the total pressure fluid volume of the master brake cylinder 2, 102 is available to the wheel brakes 7–10.

The above-mentioned compression spring 31, 131 must be rated so that the following equation is satisfied:

$$F_1 > F_{FSK} + C_{FSK} \times )S_{SK} + P_R \times A_{AK},$$

wherein $F_{FSK}$ refers to the force of a compression spring 49, 149 which acts between the second piston 20, 120 and the third piston 28, 128, $C_{FSK}$ refers to the spring rate of the compression spring 49, 149, $)S_{SK}$ refers to the travel covered by the second master cylinder piston 20, 120 in a case of malfunction when the compression spring 49, 149 is compressed, $P_R$ is the pressure which prevails in the wheel brakes 8, 10 when the electromagnetic valves 13b, 15b are open, and $A_{AK}$ is the surface of the external piston 29, 129.

LIST OF REFERENCE NUMERALS 1 actuating pedal
2 master brake cylinder
3 pressure fluid supply reservoir
4 braking pressure generator
5 braking pressure generator
6 braking pressure generator
7 wheel brake
8 wheel brake
9 wheel brake
10 wheel brake
11 line
12 line
13a,b electromagnetic valve
14 simulator chamber
15a,b electromagnet
16 piston
17 pressure chamber
18 piston
19 pressure chamber
20 piston
21 travel or position sensor
22 travel or position sensor
23 travel or position sensor
24 hydraulic cylinder
25 hydraulic cylinder
26 hydraulic cylinder
27 pressure chamber
28 piston
29 external piston
30 internal piston
31 compression spring
32 compression spring
33 annular chamber 34 piston
35 piston
36 piston
37 piston
38 bore
39 sealing sleeve
40 extension
41 pressure chamber
42 pressure chamber
43 pressure sensor
44 d-c motor
45 d-c motor
46 d-c motor
47 pressure sensor
48 brake light switch
49 compression spring
50 connection

We claim:

1. An electronically controllable brake actuating system for automotive vehicles including:
   a master brake cylinder operable by an actuating pedal and having at least one piston;
   at least one braking pressure generator actuable by an electronic control unit;
   wheel brakes of the vehicle that are directly connected to the braking pressure generator which is connectable to the master brake cylinder by at least one hydraulic connection closable by a valve assembly;
   at least one sensor device to identify travel and speed of a pedal actuation; and
   a simulator chamber within the master brake cylinder;
   wherein the simulator chamber, by way of a closable connection, is connected to a hydraulic chamber, confined in the master cylinder by a second piston.

2. A brake actuating system as claimed in claim 1, wherein the hydraulic chamber is an annular chamber.

3. A brake actuating system as claimed in claim 1, wherein the second piston has a bipartite design and includes an external piston and an internal piston which is guided in the external piston and so arranged as to be entrained by the latter piston, wherein the closable connection is provided by at least one bore in the external piston which interacts with a sealing sleeve arranged on the internal piston so that the connection is closed by a movement of the external piston and the internal piston relative to each other.

4. A brake actuating system as claimed in claim 3, wherein the internal piston has an axial extension which is movable into force-transmitting engagement with the master cylinder piston.

5. An electronically controllable brake actuating system for automotive vehicles which includes a master brake cylinder operable by an actuating pedal and having at least one piston confining a pressure chamber; at least one braking pressure generator actuatable by an electronic control unit; wheel brakes of the vehicle which are directly connected to the braking pressure generator which is connectable to the master brake cylinder by at least one hydraulic connection closable by a valve assembly; at least one sensor device to identify travel and speed of a pedal actuation; and a simulator chamber which is provided in the master brake cylinder separated from the pressure chamber and confined by a second piston, the simulator chamber being connected to a supply reservoir by a closable connection, wherein the second piston has a bipartite design and includes an external piston and an internal piston which is guided in the external piston and so arranged as to be entrained by the latter piston, wherein the closable connection is provided by at least one bore in the external piston which interacts with a sealing sleeve arranged on the internal piston so that the connection is closed by a movement of the external piston and the internal piston relative to each other.

6. A brake actuating system as claimed in claim 5, wherein the internal piston has an axial extension which is movable into force-transmitting engagement with the master cylinder piston.

* * * * *